United States Patent
Fradley et al.

(10) Patent No.: US 11,621,562 B2
(45) Date of Patent: Apr. 4, 2023

(54) RELATING TO POWER CONVERTERS

(71) Applicants: John Fradley, Stafford (GB); Li Zou, Stafford (GB); Carl Barker, Stafford (GB)

(72) Inventors: John Fradley, Stafford (GB); Li Zou, Stafford (GB); Carl Barker, Stafford (GB)

(73) Assignee: General Electric Technology GmbH, Baden (CH)

( * ) Notice: Subject to any disclaimer, the term of this patent is extended or adjusted under 35 U.S.C. 154(b) by 127 days.

(21) Appl. No.: 17/387,857

(22) Filed: Jul. 28, 2021

(65) Prior Publication Data

US 2022/0085614 A1 Mar. 17, 2022

(30) Foreign Application Priority Data

Jul. 28, 2020 (EP) .................................... 20275127

(51) Int. Cl.
*H02J 3/36* (2006.01)
*H02M 7/757* (2006.01)
*H02M 7/483* (2007.01)

(52) U.S. Cl.
CPC ............. *H02J 3/36* (2013.01); *H02M 7/4835* (2021.05); *H02M 7/7575* (2013.01)

(58) Field of Classification Search
CPC ............ H02J 3/36; H02J 3/16; H02M 7/4835; H02M 7/7575
See application file for complete search history.

(56) References Cited

U.S. PATENT DOCUMENTS

| 4,941,079 A | 7/1990 | Ooi |
| 2016/0245259 A1* | 8/2016 | Gupta ..................... F03D 9/257 |

(Continued)

FOREIGN PATENT DOCUMENTS

CN 111668866 A * 9/2020

OTHER PUBLICATIONS

EPO, "Extended European Search Report" Application No. 20275127.7, dated Feb. 1, 2021.

*Primary Examiner* — Harry R Behm
(74) *Attorney, Agent, or Firm* — Eversheds Sutherland (US) LLP

(57) ABSTRACT

In the field of high voltage direct current (HVDC) power transmission networks there is a need for an improved power converter.

A power converter, for use in a HVDC power transmission network, comprises first and second DC terminals, for connection in use to a DC network and between which extends at least one converter limb. The or each converter limb includes first and second limb portions which are separated by an AC terminal, for connection in use to an AC network. Each limb portion includes a switching valve, and the power converter including a controller programmed to control switching of the switching valves to control the flow of a converter current ($I_{max}$) through the power converter and thereby in-use transfer power between the power converter and the AC network. The power transferred between the power converter and the AC network has an active component and a reactive component. The controller is further programmed in use to:

(i) prioritize to a first extent the transfer of reactive power between the power converter and the AC network during a first operating condition, when the AC voltage (V) of the AC network lies outside a desired operating (Continued)

range, by allowing up to a first amount of the converter current ($I_{max}$) to be a reactive current; and (ii) prioritize to a second extent, less than the first extent, the transfer of reactive power between the power converter and the AC network during a second operating condition, when the AC voltage (V) of the AC network lies within the desired operating range, by limiting the amount of converter current ($I_{max}$) that can be a reactive current to a second amount, less than the first amount, the second amount being determined according to a measured operating frequency of the AC network.

10 Claims, 6 Drawing Sheets

(56) References Cited

U.S. PATENT DOCUMENTS

| | | | |
|---|---|---|---|
| 2018/0097365 A1* | 4/2018 | Adamczyk | H02J 3/36 |
| 2020/0235577 A1* | 7/2020 | Burra | H02J 3/50 |

* cited by examiner

RELATING TO POWER CONVERTERS

RELATED APPLICATION

This application claims priority to European Patent Application No. 20275127.7, filed Jul. 28, 2020, titled "Improvements In or Relating to Power Converters", the contents of which are hereby incorporated by reference.

TECHNICAL FIELD

This invention relates to a power converter, for use in a high voltage direct current (HVDC) power transmission network, and to a method of operating such a power converter.

BACKGROUND

In HVDC power transmission networks AC power is typically converted to DC power for transmission via overhead lines, under-sea cables and/or underground cables. This conversion removes the need to compensate for the AC capacitive load effects imposed by the power transmission medium, i.e. the transmission line or cable, and reduces the cost per kilometre of the lines and/or cables, and thus becomes cost-effective when power needs to be transmitted over a long distance. DC power can also be transmitted directly from offshore wind parks to onshore AC power transmission networks.

The conversion between DC power and AC power is utilized where it is necessary to interconnect DC and AC networks. In any such power transmission network, converters (i.e. power converters) are required at each interface between AC and DC power to affect the required conversion from AC to DC or from DC to AC.

SUMMARY

According to a first aspect of the invention there is provided a power converter, for use in a HVDC power transmission network, comprising first and second DC terminals for connection in use to a DC network and between which extends at least one converter limb, the or each converter limb including first and second limb portions separated by an AC terminal for connection in use to an AC network, each limb portion including a switching valve, and the power converter including a controller programmed to control switching of the switching valves to control the flow of a converter current through the power converter and thereby in-use transfer power between the power converter and the AC network, the power transferred between the power converter and the AC network having an active component and a reactive component, and
the controller being further programmed in use to:
(i) prioritise to a first extent the transfer of reactive power between the power converter and the AC network during a first operating condition, when the AC voltage of the AC network lies outside a desired operating range, by allowing up to a first amount of the converter current to be a reactive current; and
(ii) prioritise to a second extent, less than the first extent, the transfer of reactive power between the power converter and the AC network during a second operating condition, when the AC voltage of the AC network lies within the desired operating range, by limiting the amount of converter current that can be a reactive current to a second amount, less than the first amount, the second amount being determined according to a measured operating frequency of the AC network.

The inclusion of a controller which prioritises the transfer of reactive power during each of the first and second operating conditions of the power converter, helps the power converter to support a desired AC voltage at all times, e.g. following a disturbance in the associated HVDC power transmission network, i.e. the power converter of the invention is able to provide continually operating voltage support.

Meanwhile, a controller which prioritises the transfer of reactive power to a second, lesser extent, i.e. places a limit on the amount of reactive power that can be transferred by limiting the amount of converter current that can be a reactive current to a second amount (which is less than the first amount), during a second operating condition when the power converter is operating more normally and the AC voltage of the AC network is within the desired operating range, means that some converter current remains available to be an active current, and so allows the power converter to maintain a portion of its active, i.e. "real", power transfer capability, even while providing voltage support.

Maintaining a degree of real power transfer is desirable because if the operating frequency of the AC voltage is perturbed, and no real power is available, then even greater disruption to the operating frequency, e.g. an even greater rate of change of frequency or an even greater frequency nadir, i.e. frequency low, could otherwise arise. Such a greater disruption of the operating frequency potentially then leads to the initiation of more extreme frequency control measures of the power converter, which in turn would very likely reduce the effectiveness of such frequency control schemes and protection.

In addition, determining the second amount of converter current that can be a reactive current according to a measured operating frequency of the AC network, is desirable because it allows the power converter to take into account the frequency stability of the power transmission network within which it is operating when determining the amount of real power transfer capability to maintain.

Preferably the controller is programmed to determine the second amount of converter current that can be a reactive current by reducing the first amount of converter current available to be a reactive current by a reduction factor based on a measured operating frequency of the AC network.

Having the controller programmed in the foregoing manner is a convenient way of allowing the power converter to take into account the frequency stability of the power transmission network within which it is operating when determining the amount of real power transfer capability to maintain.

Optionally the reduction factor is based on a degree of deviation of the operating frequency of the AC network from a predetermined frequency operating point.

The reduction factor may be proportional to the degree of deviation of the operating frequency of the AC network from the predetermined frequency operating point.

In a preferred embodiment of the invention the degree of deviation of the operating frequency of the AC network is multiplied by a first scaling component to give the reduction factor, the first scaling component being based on a predetermined frequency deviation limit that causes a maximum permissible reduction in the reactive current.

Preferably the reduction factor is based on a rate of change of the operating frequency of the AC network.

The reduction factor may be proportional to the rate of change of the operating frequency of the AC network.

In another preferred embodiment of the invention the rate of change of the operating frequency of the AC network is multiplied by a second scaling component to give the reduction factor, the second scaling component being based on a predetermined rate of change of operating frequency limit that causes a maximum permissible reduction in the reactive current.

Optionally the reduction factor is based on both the degree of deviation of the operating frequency of the AC network from the predetermined frequency operating point and the rate of change of the operating frequency of the AC network.

Each of the foregoing arrangements has a benefit in terms of helping to maintain a desirable operating frequency of the AC network and wider associated power transmission network.

Additionally, basing the reduction factor on the rate of change of the operating frequency of the AC network is relatively straightforward to implement and is fast-acting.

Moreover, the combination of both the degree of deviation and the rate of change of operating frequency usefully accommodates longer term AC voltage deviations from the desired operating range, where voltage support may still be needed and the rate of change of operating frequency may have reduced, but the operating frequency is still deviating from the predetermined frequency operating point or is approaching a nadir.

According to a second embodiment of the invention there is provided a method of operating a power converter, for use in a HVDC power transmission network, the power converter comprising first and second DC terminals for connection in use to a DC network and between which extends at least one converter limb, the or each converter limb including first and second limb portions separated by an AC terminal for connection in use to an AC network, each limb portion including a switching valve, and the power converter including a controller programmed to control switching of the switching valves to control the flow of a converter current through the power converter and thereby in-use transfer power between the power converter and the AC network, the power transferred between the power converter and the AC network having an active component and a reactive component, and the method of operating the power converter including the steps of:
(i) prioritising to a first extent the transfer of reactive power between the power converter and the AC network during a first operating condition, when the AC voltage of the AC network lies outside a desired operating range, by allowing up to a first amount of the converter current to be a reactive current; and
(ii) prioritising to a second extent, less than the first extent, the transfer of reactive power between the power converter and the AC network during a second operating condition, when the AC voltage of the AC network lies within the desired operating range, by limiting the amount of converter current that can be a reactive current to a second amount, less than the first amount, the second amount being determined according to a measured operating frequency of the AC network.

The method of the invention shares the advantages of the corresponding features of the power converter of the invention.

It will be appreciated that the use of the terms "first" and "second", and the like, in this patent specification is merely intended to help distinguish between similar features, and is not intended to indicate the relative importance of one feature over another feature, unless otherwise specified.

Within the scope of this application it is expressly intended that the various aspects, embodiments, examples and alternatives set out in the preceding paragraphs, and the claims and/or the following description and drawings, and in particular the individual features thereof, may be taken independently or in any combination. That is, all embodiments and all features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF DRAWINGS

There now follows a brief description of preferred embodiments of the invention, by way of non-limiting example, with reference being made to the following figures in which.

DETAILED DESCRIPTION

Figure 1:
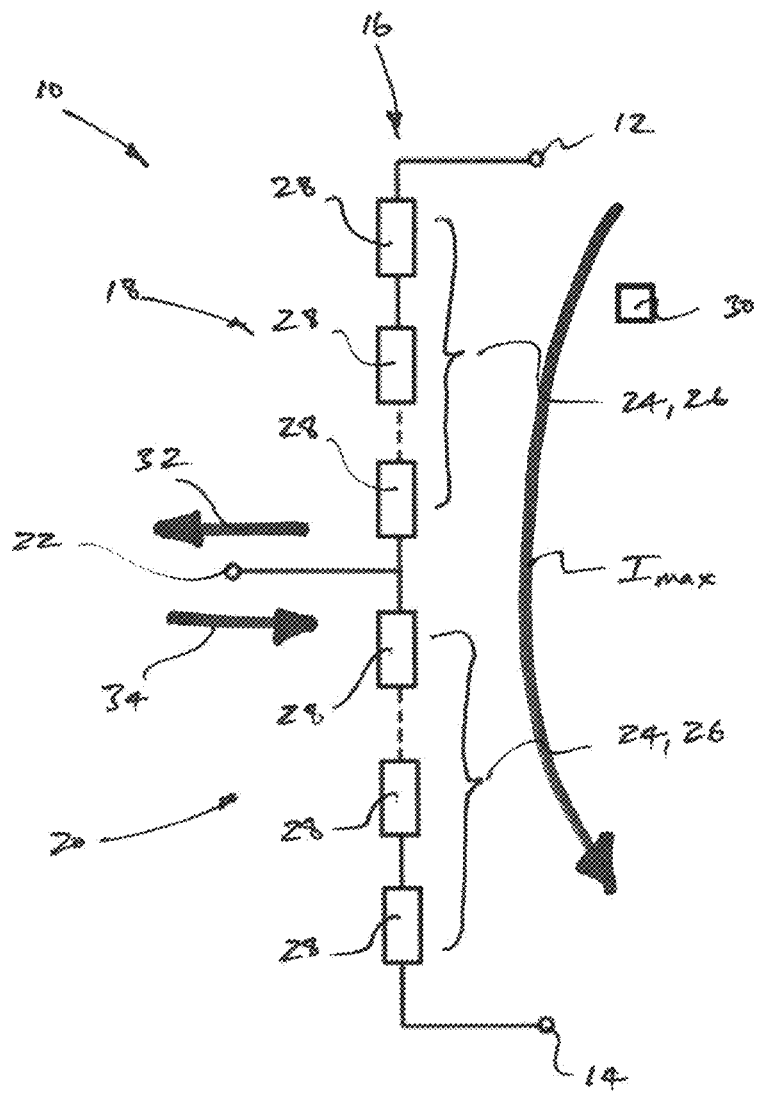
FIG. 1 shows a schematic view of a power converter according to a first embodiment of the invention.

One type of power converter is a voltage source converter 10, as shown schematically in FIG. 1, although other types of power converter are also possible.

The voltage source converter 10 includes first and second DC terminals 12, 14, between which extends a converter limb 16. Other voltage source converters may include more than one converter limb and, in particular, may include three converter limbs each of which corresponds to a given phase of a three-phase electrical power system.

The converter limb 16 includes first and second limb portions 18, 20 which are separated by an AC terminal 22.

In use the first and second DC terminals 12, 14 are connected to a DC network, and the AC terminal 22 is connected to an AC network.

Each limb portion 18, 20 includes a switching valve 24 which, in a voltage source converter 10 of the type shown, takes the form of a chain-link converter 26 that extends between the AC terminal 22 and a corresponding one of the first or the second DC terminal 12, 14. Each chain-link converter 26 includes a plurality of series connected chain-link modules 28.

Each chain-link module 28 includes a number of switching elements (not shown) which are connected in parallel with an energy storage device in the form of a capacitor.

Other types of energy storage device, i.e. any device that is capable of storing and releasing energy to selectively provide a voltage, e.g. a fuel cell or battery, may also be used however.

Each switching element includes a semiconductor device, typically in the form of an Insulated Gate Bipolar Transistor (IGBT).

It is, however, possible to use other types of self-commutated semiconductor devices, such as a gate turn-off thyristor (GTO), a field effect transistor (FET), a metal-oxide-semiconductor field-effect transistor (MOSFET), an injection-enhanced gate transistor (IEGT), an integrated gate commutated thyristor (IGCT), a bimode insulated gate transistor (BIGT) or any other self-commutated switching device. In addition, one or more of the semiconductor devices may instead include a wide-bandgap material such as, but not limited to, silicon carbide, boron nitride, gallium nitride and aluminium nitride.

The number of semiconductor devices in each switching element may vary depending on the required voltage and current ratings of that switching element.

Each of the switching elements also includes a passive current check element that is connected in anti-parallel with a corresponding semiconductor device. The or each passive current check element may include at least one passive current check device. The or each passive current check device may be any device that is capable of limiting current flow in only one direction, e.g. a diode. The number of passive current check devices in each passive current check element may vary depending on the required voltage and current ratings of that passive current check element.

A first exemplary chain-link module includes a first pair of switching elements connected in parallel with a capacitor in a known half-bridge arrangement to define a 2-quadrant unipolar module. Switching of the switching elements selectively directs current through the capacitor or causes current to bypass the capacitor, such that the first exemplary chain-link module can provide zero or positive voltage and can conduct current in two directions.

A second exemplary chain-link module includes first and second pairs of switching elements and a capacitor connected in a known full bridge arrangement to define a 4-quadrant bipolar module. In a similar manner to the first exemplary chain-link module, switching of the switching elements again selectively directs current through the capacitor or causes current to bypass the capacitor such that the second exemplary chain-link module can provide zero, positive or negative voltage and can conduct current in two directions.

Each chain-link converter 26 may include solely first exemplary chain-link modules, solely second exemplary chain-link modules, or a combination of first and second exemplary chain-link modules.

In any event, the provision of a plurality of chain-link modules means that it is possible to build up a combined voltage across each chain-link converter 26, via the insertion of the energy storage devices, i.e. the capacitors, of multiple chain-link modules 28 (with each chain-link module providing its own voltage), which is higher than the voltage available from each individual chain-link module.

Accordingly, each of the chain-link modules 28 work together to permit the chain-link converters 26 to provide a stepped variable voltage source. This permits the generation of a voltage waveform across each chain-link converter 26 using a step-wise approximation. As such each chain-link converter 26 is capable of providing a wide range of complex waveforms.

For example, operation of each chain-link converter 26 in the foregoing manner can be used to generate an AC voltage waveform at the AC terminal 22.

The power converter, i.e. voltage source converter 10, also includes a controller 30 that is programmed to control the switching of the chain-link converters 26, i.e. the switching valves 24, to control the flow of a converter current $I_{max}$ through the voltage source converter 10 to generate the aforementioned AC voltage waveform, and thereby enable power to be transferred between the voltage source converter 10 and the AC network, between the voltage source converter 10 and the DC network, and hence between the AC and DC networks.

The power transferred between the voltage source converter 10 and the AC network has an active component, which results in a net transfer of energy in one direction when averaged over a complete cycle (and is also known as "real power" 32), and a reactive component that is the portion of reactive power 34 due to stored energy which returns to the energy source in each cycle.

The controller 30 is further programmed, in use, to prioritise to a first extent the transfer of reactive power 34 between the voltage source converter 10 and the AC network during a first operating condition when the AC voltage of the AC network lies outside a desired operating range, i.e. when the AC voltage of the AC network is below a minimum acceptable voltage $V_{min}$, which might be 0.9 pu (i.e. 10% below a desired AC operating voltage), or above a maximum acceptable voltage $V_{max}$, which might be 1.1 pu (i.e. 10% above the desired AC operating voltage).

The controller 30 achieves such prioritisation of the transfer of reactive power 34, in the foregoing circumstances, by allowing up to a first amount of the converter current $I_{max}$ to be a reactive current, i.e. by setting a limit for reactive current $Iq_{lim\_max}$ to be a first amount. In the embodiment shown such a first amount is all of the converter current that can flow through the voltage source converter 10, i.e. the maximum converter current $I_{max}$, although in other embodiments of the invention it may be less than the maximum available converter current $I_{max}$, such as 70-80% of the maximum available converter current $I_{max}$ for example.

Accordingly, in the embodiment shown, the controller 30 sets the limit for reactive current according to $$Iq_{lim\_max} = I_{max}$$

when $$V \notin [V_{min}, V_{max}]$$

where,

V is the AC voltage at the AC terminal 22.

In addition, the controller 30 is also programmed to prioritise to a second extent, which is less than the first extent, the transfer of reactive power 34 between the voltage source converter 10 and the AC network during a second operating condition when the AC voltage of the AC network lies within the desired operating range, i.e. when the AC voltage of the AC network is above the minimum acceptable voltage $V_{min}$ and below the maximum acceptable voltage $V_{max}$, e.g. when the AC voltage is between 0.9 pu and 1.1 pu (i.e. not more than 10% above or below the desired AC operating voltage).

Under these other operating conditions, e.g. when the AC voltage is between 0.9 pu and 1.1 pu, the controller 30 prioritises the transfer of reactive power 34 to the second, lesser extent, by limiting the amount of converter current $I_{max}$ that can be a reactive current to a second amount, which is less than the first amount. Such a second amount of converter current $I_{max}$ that can be a reactive current is determined according to a measured operating frequency of the AC network.

More particularly, the controller 30 is programmed to determine the second amount of converter current $I_{max}$ that can be a reactive current by reducing the first amount of converter current available to be a reactive current, which in the embodiment shown is the maximum available converter current $I_{max}$, by a reduction factor α based on a measured operating frequency of the AC network.

More particularly still, the reduction factor α may be based on: (i) the degree of deviation Δf of the operating frequency of the AC network from a predetermined frequency operating point $f_{ref}$; (ii) the rate of change $\dot{f}$ of the operating frequency of the AC network; or both the degree of deviation Δf and the rate of change $\dot{f}$ of the operating frequency.

In embodiments where the reduction factor α is based solely on the degree of deviation Δf of the operating frequency of the AC network from a predetermined frequency operating point $f_{ref}$, the reduction factor α is proportional to the degree of deviation Δf of the operating frequency of the AC network from the predetermined frequency operating point $f_{ref}$, and more specifically the degree of deviation Δf of the operating frequency of the AC network is multiplied by a first scaling component k1 to give the reduction factor α.

Figure 2:
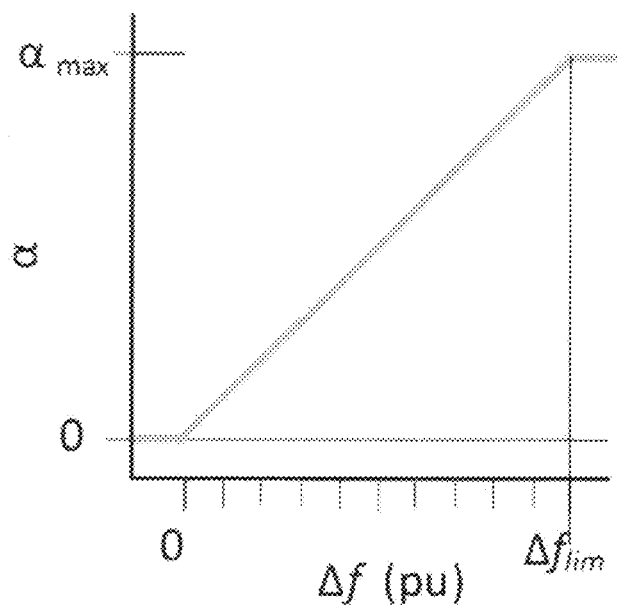
FIG. 2 shows the relationship between a predetermined frequency deviation limit and a maximum permissible reduction in reactive current which gives rise to a first scaling component.

Meanwhile, the first scaling component k1 is itself based on a predetermined frequency deviation limit $\Delta f_{lim}$ that causes a maximum permissible reduction $\alpha_{max}$ in the reactive current, which is represented visually in FIG. 2.

Accordingly, in such embodiments, the reduction factor α is given by $$\alpha = k1 \times \Delta f$$

where, $$k1 = \frac{\alpha_{max}}{\Delta f_{lim}}$$

and $$\Delta f = f_{ref} - f_{PLL}$$

with, $f_{PLL}$ being a measured AC voltage frequency obtained using a phase locked loop (although other known frequency measurement or estimation techniques may be used to obtain the AC voltage frequency).

A moving average function may be added to the measured frequency $f_{PLL}$ to remove any noise generated. Alternatively, any other known filtering or noise removal technique may be applied to remove noise from the measured frequency $f_{PLL}$.

It follows that the controller 30 determines the second amount of converter current $I_{max}$ that can be a reactive current, i.e. sets a limit for reactive current $Iq_{lim\_max}$, according to $$Iq_{lim\_max} = I_{max} - \alpha$$

when $$V \in [V_{min}, V_{max}]$$

where,

V is the AC voltage at the AC terminal 22.

Moreover, this enables the controller 30 to set a limit for active current $Id_{lim\_max}$ during the same operating conditions, e.g. when the AC voltage is between 0.9 pu and 1.1 pu, according to the corollary of the reactive current limit, i.e. according to $$Id_{lim\_max} = \sqrt{(I_{max})^2 - (Iq_{ref})^2}$$

where, $I_{max}$ is the maximum amount of converter current that can flow through the voltage source converter 10; and $Iq_{ref}$ is a measured reactive current flowing through the voltage source converter 10 (which, as indicated above, is limited to $I_{max} - \alpha$).

By way of example, FIGS. 3A to 3D illustrate the impact of a disturbance, e.g. a loss of generation, at a time of 3 seconds, on various parameters of a 300 MVA voltage source converter having a controller programmed in the aforementioned manner.

The example voltage source converter is additionally configured as follows:

$I_{max}$ is 0.94 pu (with the converter current set at 1 kA peak/phase);

$f_{ref}$ is 50 Hz;

$V_{min}$ is 0.9 pu;

$V_{max}$ is 1.1 pu; and k1 is 20 pu.

Figure 3A:
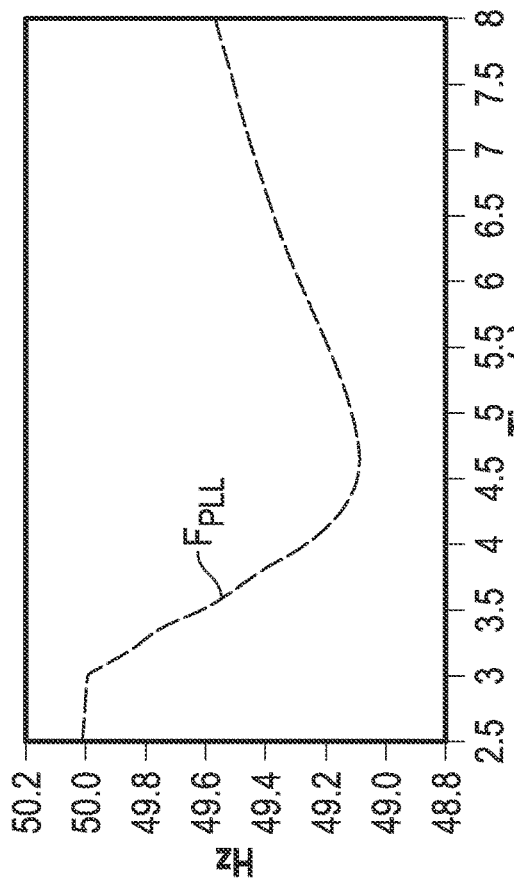
FIGS. 3A to 3D illustrate the impact of a disturbance on various parameters of a 300 MVA voltage source converter having a controller programmed in accordance with an embodiment of the invention.
Figure 3B:
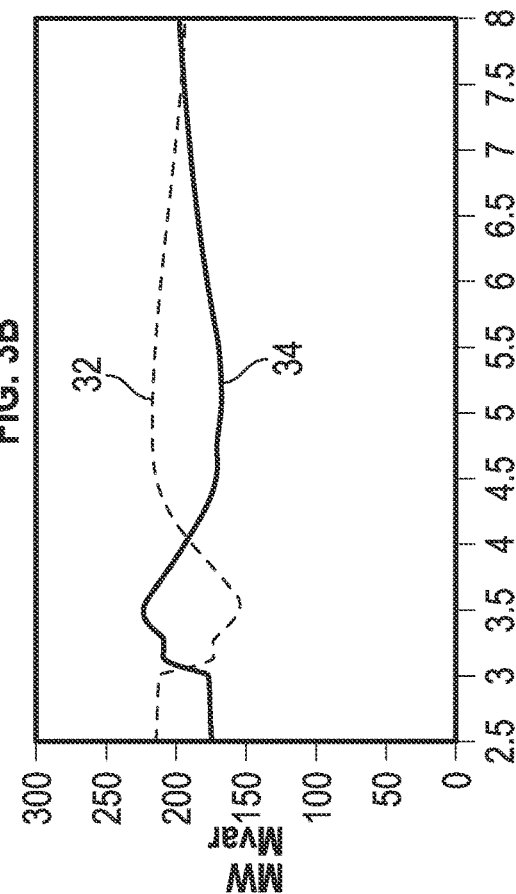

FIG. 3A shows the fall, to a nadir of 0.965 pu, and subsequent recovery of the AC voltage V at the AC terminal 22, while FIG. 3B shows the measured frequency $f_{PLL}$ of the AC voltage, which falls to a nadir of 49.1 Hz before beginning to recover.

Figure 3C:
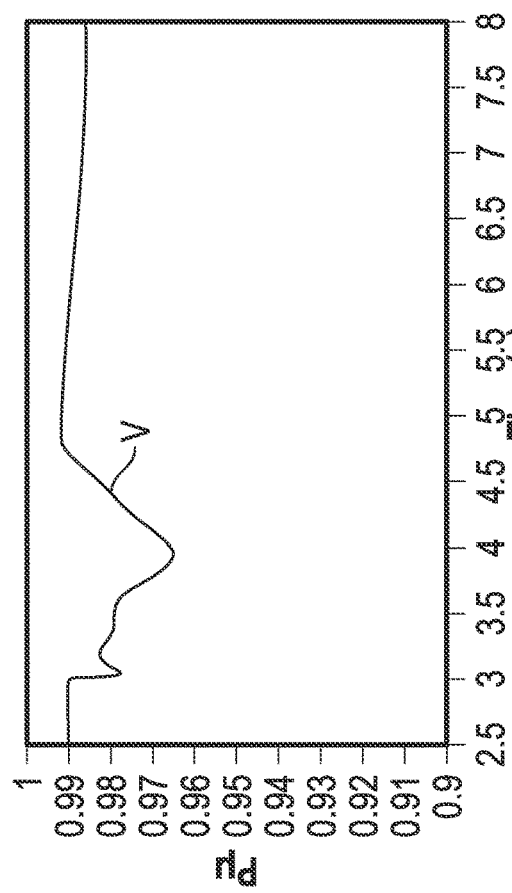
Figure 3D:
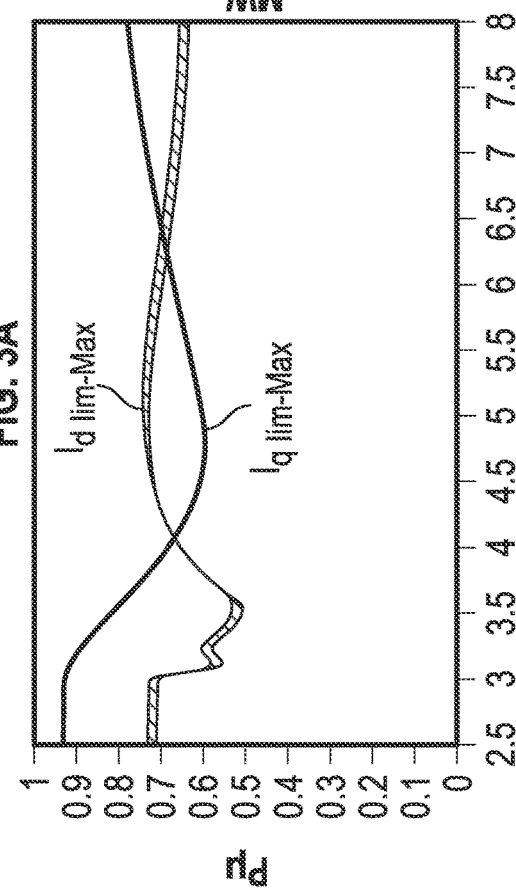

Meanwhile, FIG. 3C shows the variation in each of the reactive current limit $Iq_{lim\_max}$ and the active current limit $Id_{lim\_max}$, as the priority given to reactive power 34 transfer within the voltage source converter reduces, from the first extent to the second extent, to allow some degree of real power 32 transfer to be maintained, as shown in FIG. 3D.

In other embodiments of the invention where the reduction factor α is based solely on the rate of change $\dot{f}$ of the operating frequency of the AC network, the reduction factor α is proportional to the rate of change $\dot{f}$ of the operating frequency of the AC network, and more specifically the rate of change $\dot{f}$ of the operating frequency of the AC network is multiplied by a second scaling component k2 to give the reduction factor α.

Figure 4:
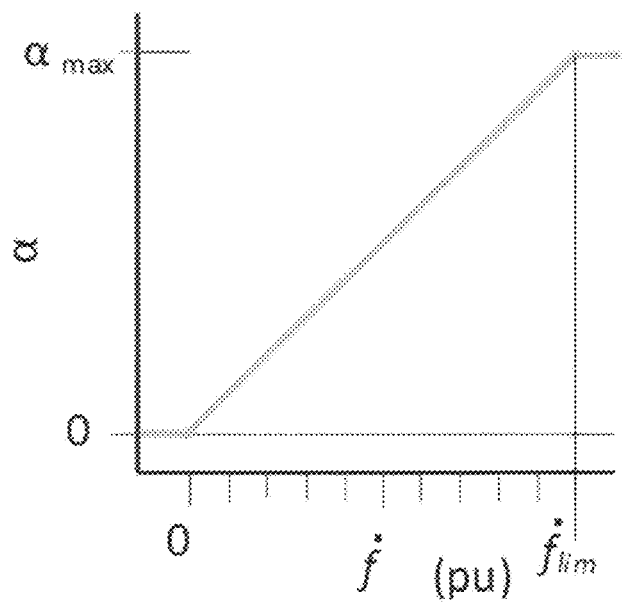
FIG. 4 shows the relationship between a predetermined rate of change of operating frequency limit and a maximum permissible reduction in reactive current that gives rise to a second scaling component.

The second scaling component k2 is itself based on a predetermined rate of change of operating frequency limit $\dot{f}_{lim}$ that causes a maximum permissible reduction $\alpha_{max}$ in the reactive current, as represented visually in FIG. 4.

It follows that in such embodiments, the reduction factor α is given by $$\alpha = k2 \times \dot{f}$$

where, $$k2 = \frac{\alpha_{max}}{\dot{f}_{lim}}$$

and $$\dot{f} = \frac{f_1 - f_0}{\Delta t}$$

with,
$f_0$ and $f_1$ being frequency samples taken at two set times; and
$\Delta t$ being the fixed time difference between the frequency samples.

In such other embodiments of the invention, the controller 30 again determines the second amount of converter current $I_{max}$ that can be a reactive current, i.e. sets the limit for reactive current $Iq_{lim\_max}$, as follows $$Iq_{lim\_max} = I_{max} - \alpha$$

and similarly sets a corresponding limit for and active current $Id_{lim\_max}$ according to $$Id_{lim\_max} = \sqrt{(I_{max})^2 - (Iq_{ref})^2}$$

when $$V \in [V_{min}, V_{max}]$$

By way of similar example, FIGS. 5A to 5D again illustrate the impact of a disturbance, e.g. a loss of generation, at a time of 3 seconds, on various parameters of a 300 MVA voltage source converter having a controller programmed in the foregoing manner.

The example voltage source converter is again similarly additionally configured as follows:
$I_{max}$ is 0.94 pu (with the converter current set at 1 kA peak/phase);
$f_{ref}$ is 50 Hz;
$V_{min}$ is 0.9 pu;
$V_{max}$ is 1.1 pu; and
k2 is 50 pu.

Figure 5A:
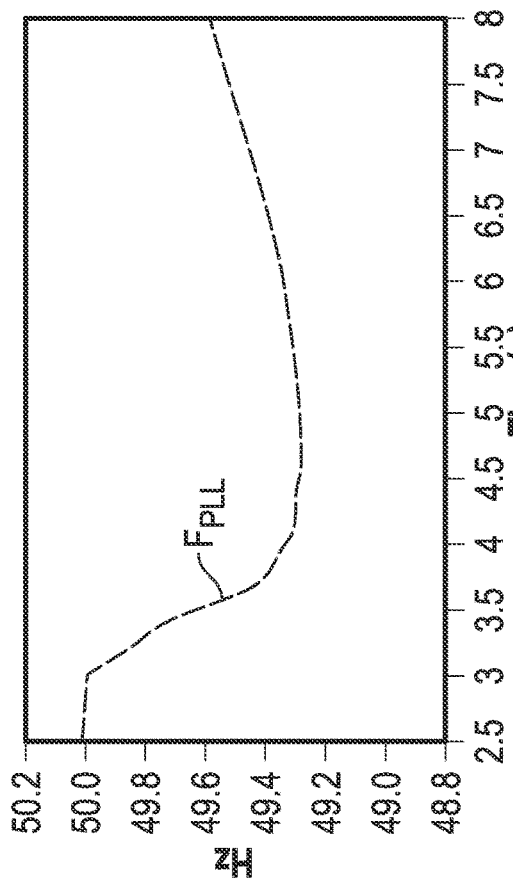
FIGS. 5A to 5D illustrate the impact of a disturbance on various parameters of a 300 MVA voltage source converter having a controller programmed in accordance with another embodiment of the invention.
Figure 5B:
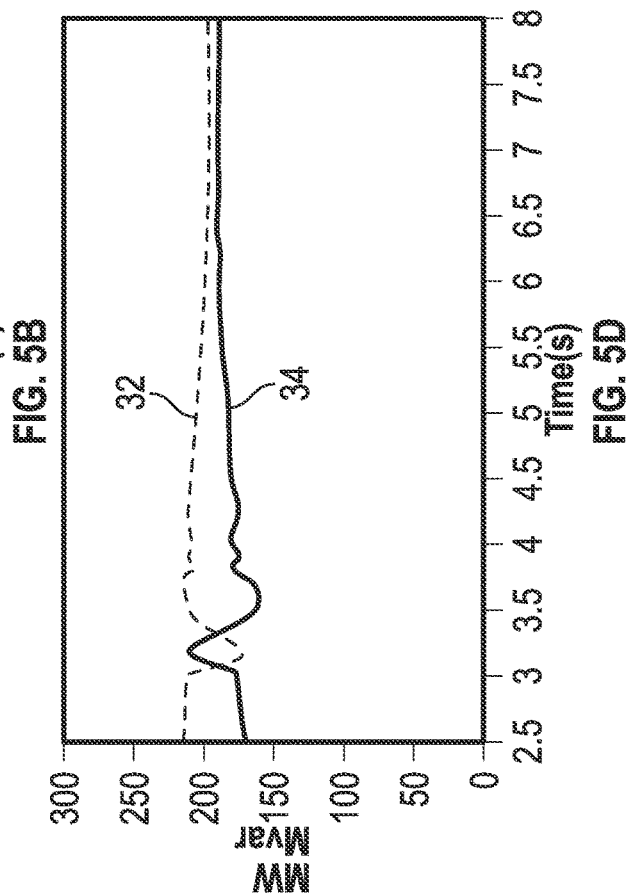

FIG. 5A shows the fall, to a nadir of 0.945 pu, and subsequent recovery of the AC voltage V at the AC terminal 22, while FIG. 5B shows the measured frequency $f_{PLL}$ of the AC voltage, which falls to a nadir of 49.27 Hz before beginning to recover.

Figure 5C:
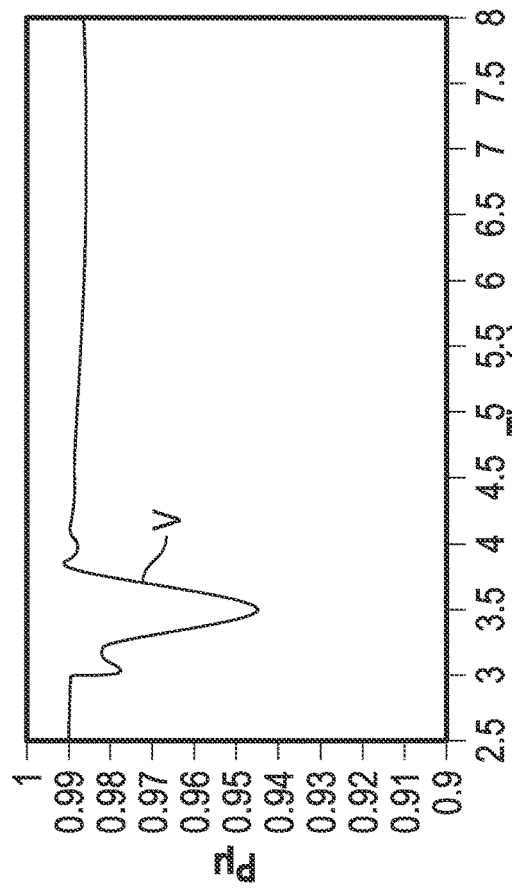
Figure 5D:
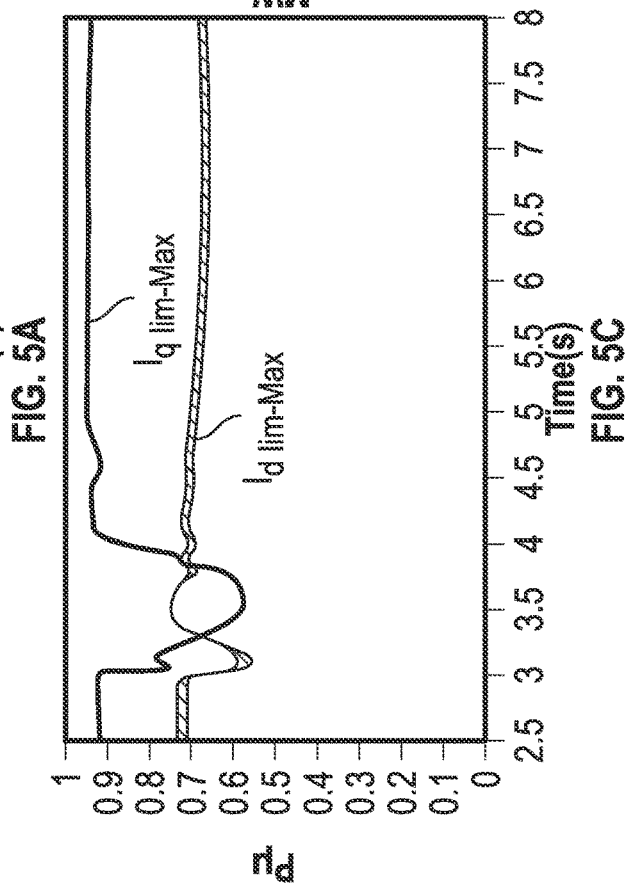

Meanwhile, FIG. 5C shows the variation in each of the reactive current limit $Iq_{lim\_max}$ and the active current limit $Id_{lim\_max}$, as the priority given to reactive power 34 transfer within the voltage source converter reduces, from the first extent to the second extent, to allow some degree real power 32 transfer to be maintained, as shown in FIG. 5(*d*).

In still further embodiments of the invention, where the reduction factor α is based on both the degree of deviation Δf of the operating frequency of the AC network from a predetermined frequency operating point $f_{ref}$ and the rate of change $\dot{f}$ of the operating frequency of the AC network, the said reduction factor α is given by $$\alpha = (k1 \times \Delta f) + (k2 \times \dot{f})$$

with the first and second scaling components k1 and k2 being established in the same manner as described above in relation to the other embodiments of the invention.

In such further embodiments of the invention, the controller 30 again determines the second amount of converter current $I_{max}$ that can be a reactive current, i.e. sets the limit for reactive current $Iq_{lim\_max}$, as follows $$Iq_{lim\_max} = I_{max} - \alpha$$

and similarly sets a corresponding limit for and active current $Id_{lim\_max}$ according to $$Id_{lim\_max} = \sqrt{(I_{max})^2 - (Iq_{ref})^2}$$

when $$V \in [V_{min}, V_{max}]$$

Accordingly, and by way of a further similar example, FIGS. 6A to 6D again illustrate the impact of a disturbance, e.g. a loss of generation, at a time of 3 seconds, on various parameters of a 300 MVA voltage source converter having a controller programmed in the foregoing manner.

The example voltage source converter is again similarly additionally configured as follows:
$I_{max}$ is 0.94 pu (with the converter current set at 1 kA peak/phase);
$f_{ref}$ is 50 Hz;
$V_{min}$ is 0.9 pu;
$V_{max}$ is 1.1 pu;
k1 is 20 pu; and
k2 is 25 pu.

Figure 6A:
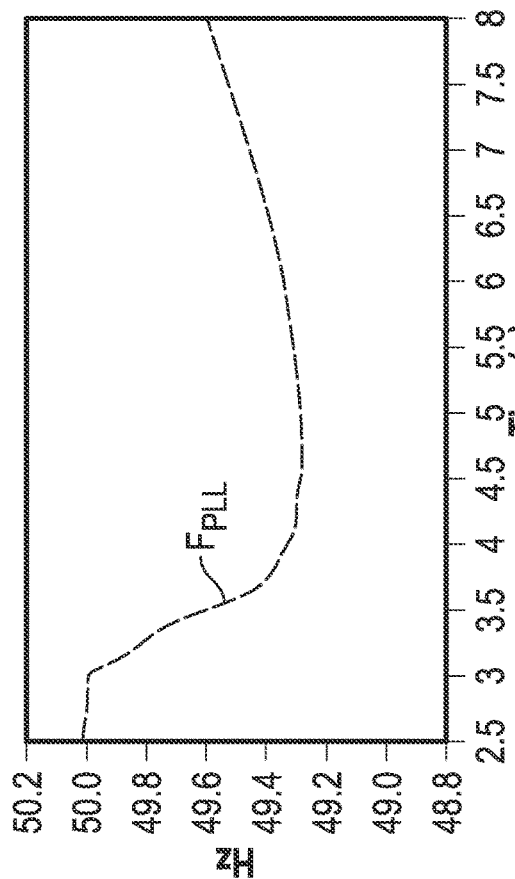
FIGS. 6A to 6D illustrate the impact of a disturbance on various parameters of a 300 MVA voltage source converter having a controller programmed in accordance with a further embodiment of the invention.
Figure 6B:
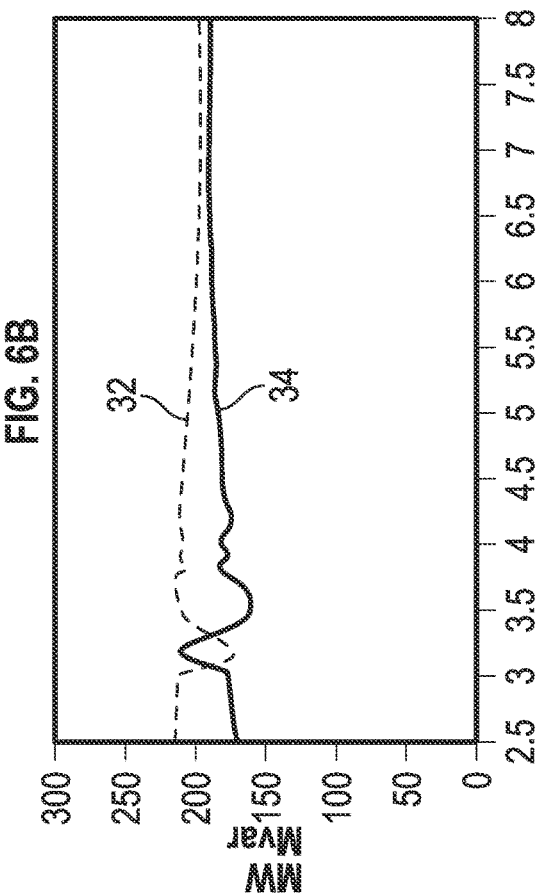

FIG. 6A shows the fall, to a nadir of 0.949 pu, and subsequent recovery of the AC voltage V at the AC terminal 22, while FIG. 6B shows the measured frequency $f_{PLL}$ of the AC voltage, which falls to a nadir of 49.27 Hz before beginning to recover.

Figure 6C:
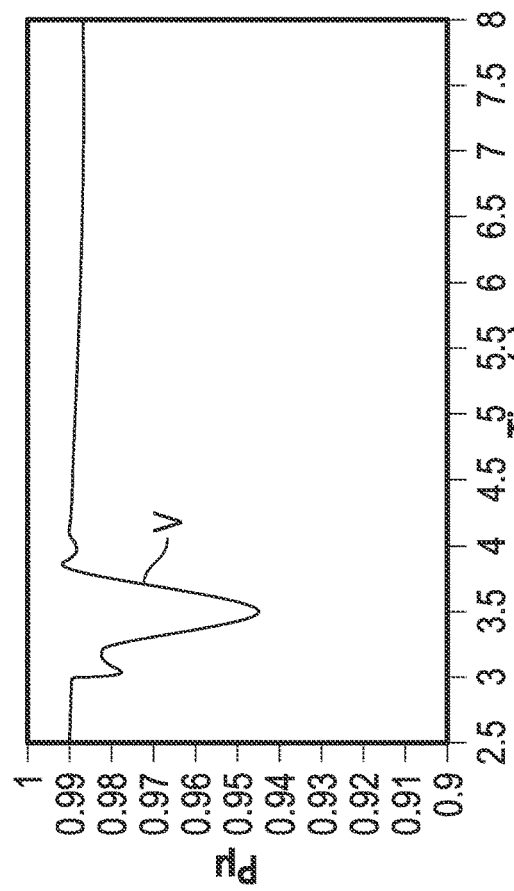
Figure 6D:
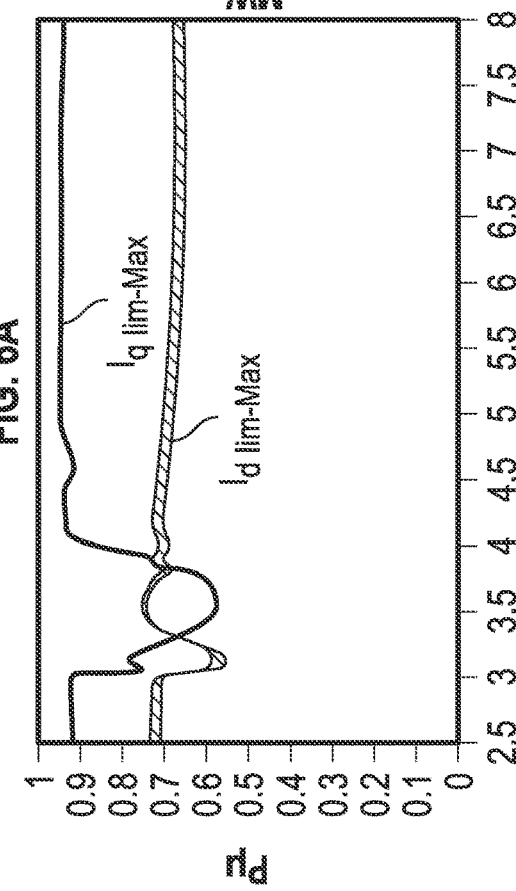

Meanwhile, FIG. 6C shows the variation in each of the reactive current limit $Iq_{lim\_max}$ and the active current limit $Id_{lim\_max}$, as the priority given to reactive power 34 transfer within the voltage source converter reduces, from the first extent to the second extent, to allow some degree of real power 32 transfer to be maintained, as shown in FIG. 6D.

In contrast to each of the embodiments described hereinabove, FIGS. 7A to 7D illustrate the impact of a disturbance, e.g. a loss of generation, at a time of 3 seconds, on various parameters of a known 300 MVA voltage source converter which has a controller programmed to provide a conventional, standard degree of voltage support in which reactive power transfer is always given full priority, i.e. the maximum available converter current is always made available in full to be a reactive current, irrespective of whether the AC voltage of the AC network lies within or without the desired operating range $V_{min}$ to $V_{max}$.

The known voltage source converter is additionally configured as follows:
$I_{max}$ is 0.94 pu (with the converter current set at 1 kA peak/phase);
$f_{ref}$ is 50 Hz;
$V_{min}$ is 0.9 pu;
$V_{max}$ is 1.1 pu; and
Standard voltage support gain is 15 pu.

Figure 7A:
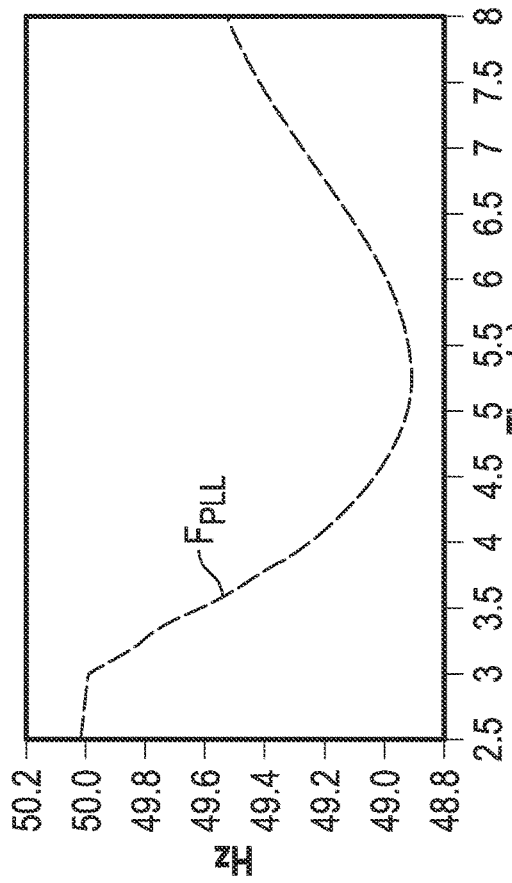
FIGS. 7A to 7D illustrate the impact of a disturbance on various parameters of a known 300 MVA voltage source converter in which full priority is always given to reactive power transfer.
Figure 7B:
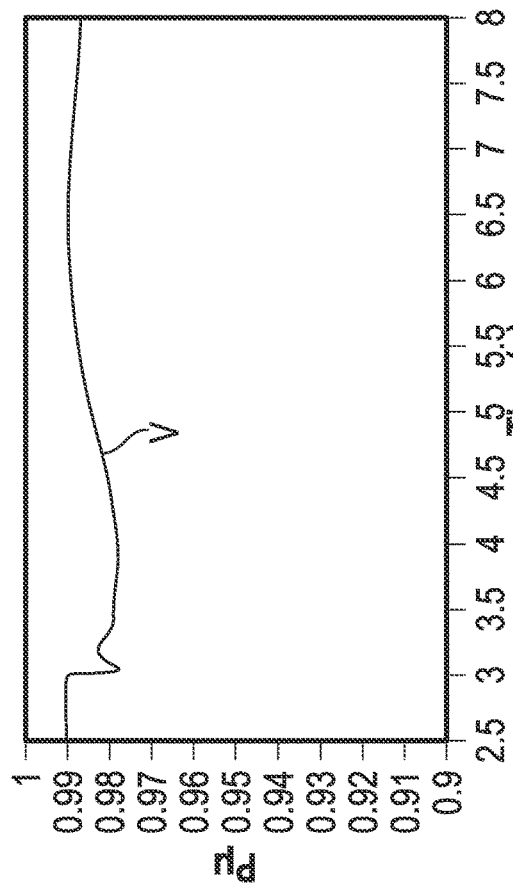

While the AC voltage V nadir, as shown in FIG. 7A, is less deep at 0.977 pu than is the case with each of the aforementioned embodiments of the invention, FIG. 7B indicates that the measured frequency $f_{PLL}$ of the AC voltage falls to a lower level of 48.90 Hz than in each of the embodiments of the invention.

Figure 7C:
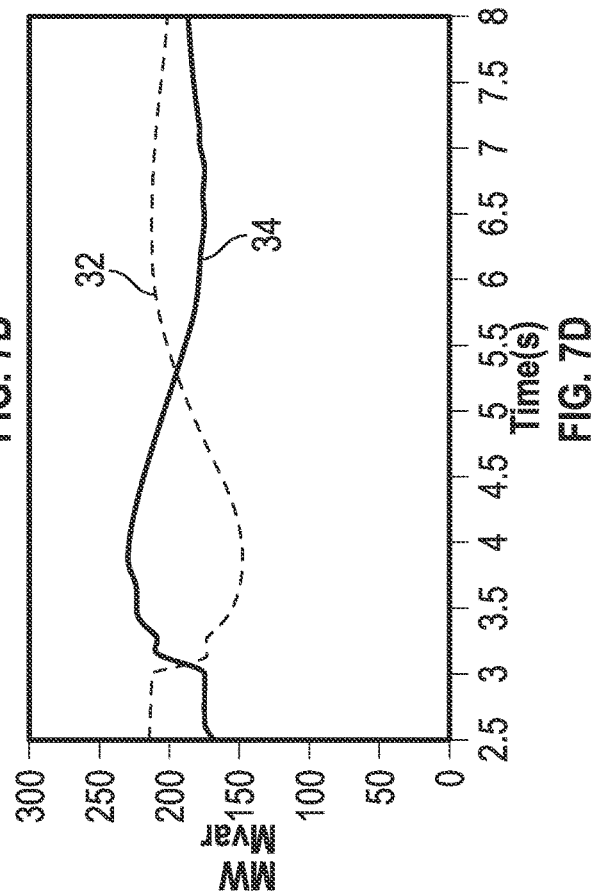
Figure 7D:
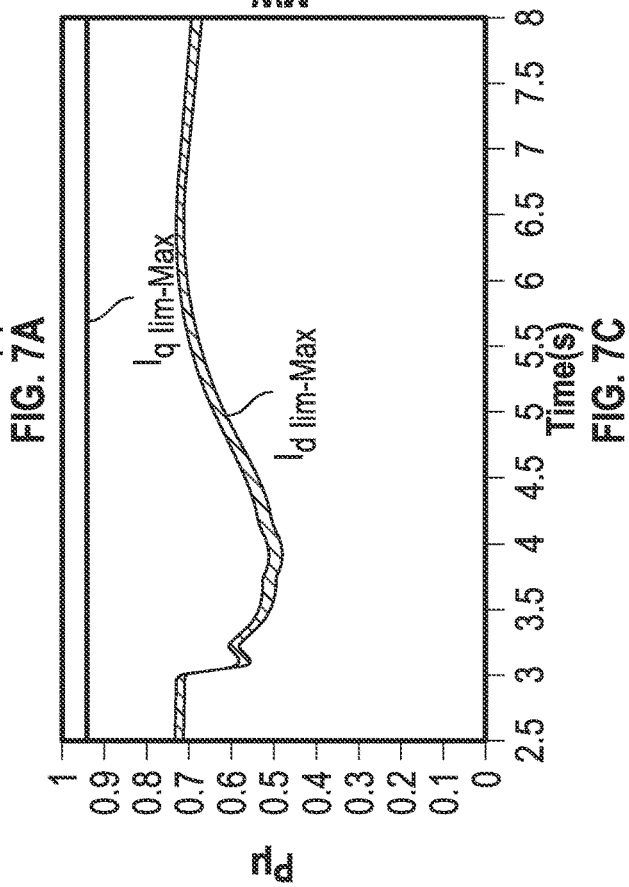

Also, as a result of the greater reduction in the active current limit $Id_{lim\_max}$ than in each of the embodiments of the invention (as shown in FIG. 7C), the real power 32 transferred following the disturbance, as shown in FIG. 7D, is lower and remains lower for longer than in relation to each of the embodiments of the invention described above.

The invention claimed is:

1. A power converter, for use in a HVDC power transmission network, comprising first and second DC terminals for connection in use to a DC network and between which extends at least one converter limb, the or each converter limb including first and second limb portions separated by an AC terminal for connection in use to an AC network, each limb portion including a switching valve, and the power converter including a controller programmed to control switching of the switching valves to control the flow of a converter current ($I_{max}$) through the power converter and thereby in-use transfer power between the power converter and the AC network, the power transferred between the power converter and the AC network having an active component and a reactive component, and the controller being further programmed in use to:
(i) prioritize to a first extent the transfer of reactive power between the power converter and the AC network during a first operating condition, when the AC voltage (V) of the AC network lies outside a desired operating range, by allowing up to a first amount of the converter current ($I_{max}$) to be a reactive current; and
(ii) prioritize to a second extent, less than the first extent, the transfer of reactive power between the power converter and the AC network during a second operating condition, when the AC voltage (V) of the AC network lies within the desired operating range, by limiting the amount of converter current ($I_{max}$) that can be a reactive current to a second amount, less than the first amount, the second amount being determined according to a measured operating frequency of the AC network.

2. The power converter according to claim 1 wherein the controller is programmed to determine the second amount of converter current ($I_{max}$) that can be a reactive current by reducing the first amount of converter current ($I_{max}$) available to be a reactive current by a reduction factor ($\alpha$) based on a measured operating frequency of the AC network.

3. The power converter according to claim 2 wherein the reduction factor ($\alpha$) is based on a degree of deviation ($\Delta f$) of the operating frequency of the AC network from a predetermined frequency operating point ($f_{ref}$).

4. The power converter according to claim 3 wherein the reduction factor ($\alpha$) is proportional to the degree of deviation ($\Delta f$) of the operating frequency of the AC network from the predetermined frequency operating point ($f_{ref}$).

5. The power converter according to claim 4 wherein the degree of deviation ($\Delta f$) of the operating frequency of the AC network is multiplied by a first scaling component (k1) to give the reduction factor ($\alpha$), the first scaling component (k1) being based on a predetermined frequency deviation limit ($\Delta f_{lim}$) that causes a maximum permissible reduction ($\alpha_{max}$) in the reactive current.

6. The power converter according to claim 2 wherein the reduction factor ($\alpha$) is based on a rate of change ($\dot{f}$) of the operating frequency of the AC network.

7. The power converter according to claim 6 wherein the reduction factor ($\alpha$) is proportional to the rate of change ($\dot{f}$) of the operating frequency of the AC network.

8. The power converter according to claim 7 wherein the rate of change ($\dot{f}$) of the operating frequency of the AC network is multiplied by a second scaling component (k2) to give the reduction factor ($\alpha$), the second scaling component (k2) being based on a predetermined rate of change of operating frequency limit ($\dot{f}_{lim}$) that causes a maximum permissible reduction ($\alpha_{max}$) in the reactive current.

9. The power converter according to claim 2 wherein the reduction factor ($\alpha$) is based on both the degree of deviation ($\Delta f$) of the operating frequency of the AC network from the predetermined frequency operating point ($f_{ref}$) and the rate of change ($\dot{f}$) of the operating frequency of the AC network.

10. A method of operating a power converter, for use in a HVDC power transmission network, the power converter comprising first and second DC terminals for connection in use to a DC network and between which extends at least one converter limb, the at least one converter limb including first and second limb portions separated by an AC terminal for connection in use to an AC network, each limb portion including a switching valve, and the power converter including a controller programmed to control switching of the switching valves to control the flow of a converter current ($I_{max}$) through the power converter and thereby in-use transfer power between the power converter and the AC network, the power transferred between the power converter and the AC network having an active component and a reactive component, and the method of operating the power converter comprising:
(i) prioritizing to a first extent the transfer of reactive power between the power converter and the AC network, during a first operating condition when the AC voltage of the AC network lies outside a desired operating range, by allowing up to a first amount of the converter current ($I_{max}$) to be a reactive current; and
(ii) prioritizing to a second extent, less than the first extent, the transfer of reactive power between the power converter and the AC network during a second operating condition, when the AC voltage of the AC network lies within the desired operating range, by limiting the amount of converter current ($I_{max}$) that can be a reactive current to a second amount, less than the first amount, the second amount being determined according to a measured operating frequency of the AC network.

* * * * *